United States Patent
Lansinger et al.

(10) Patent No.: US 6,948,386 B2
(45) Date of Patent: Sep. 27, 2005

(54) SHOCK RESISTANT STRAIN GAGE—SEAT MOUNTED

(75) Inventors: Jere R Lansinger, Bloomfield Hills, MI (US); D. Scott Bittinger, Fenton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/754,859

(22) Filed: Jan. 9, 2004

(65) Prior Publication Data
US 2005/0150307 A1    Jul. 14, 2005

(51) Int. Cl.[7] .................................................. G01L 1/00
(52) U.S. Cl. ................................................ 73/862.382
(58) Field of Search ........................... 73/818, 862.382

(56) References Cited

U.S. PATENT DOCUMENTS

| | | |
|---|---|---|
| 4,361,199 A | 11/1982 | Ulicny |
| 4,420,054 A | 12/1983 | Caris |
| 5,535,631 A * | 7/1996 | Paine .......................... 73/855 |
| 5,760,313 A * | 6/1998 | Guentner et al. ...... 73/862.584 |
| 6,331,682 B1 | 12/2001 | Hopkins et al. |

OTHER PUBLICATIONS

Lebow Model 6214 Data Sheet (http://www.legow.com/prodfolder/6214.pdf).

* cited by examiner

Primary Examiner—Max Noori
(74) Attorney, Agent, or Firm—Thomas A. Jurecko

(57) ABSTRACT

An over-travel protection device is provided for placing in a load path between a load cell and an object being weighed. The device has a first member positioned to be in the load path and a second member also positioned to be in the load path. The second member is arranged to cooperate with the first member to transfer load force from the object to the load cell. The first and second members define a space between one another and a compressible member is disposed in the space between the first member and the second member. A retaining member is adapted to limit separation displacement between the first and second members.

7 Claims, 1 Drawing Sheet

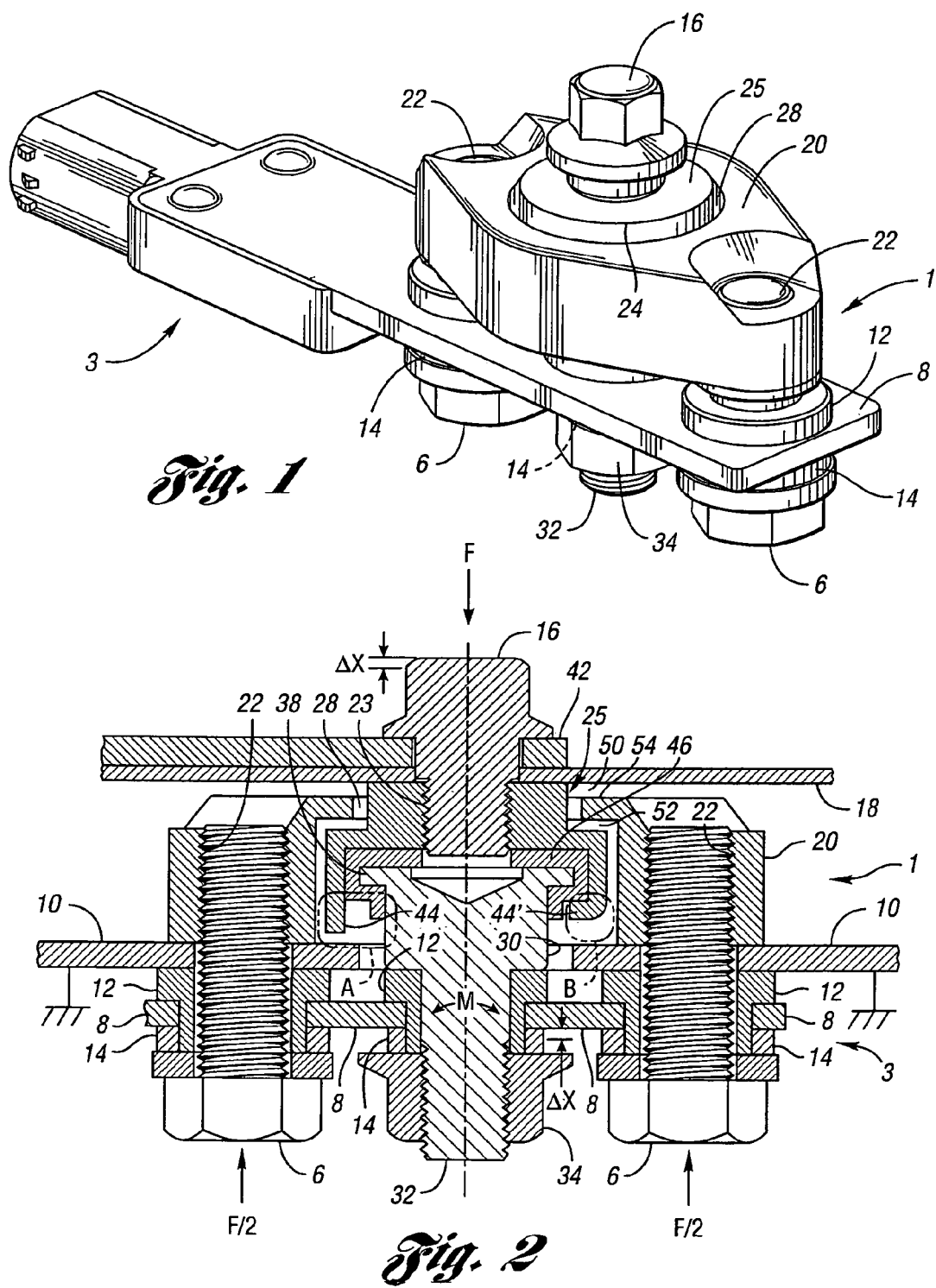

SHOCK RESISTANT STRAIN GAGE—SEAT MOUNTED

FIELD OF THE INVENTION

This invention relates generally to methods of attaching an occupant classification sensor to a vehicle, and more particularly to methods of preventing over-extension or over-compression of the sensor.

BACKGROUND

A common type of occupant classification sensor uses a load cell to determine the weight of a vehicle occupant. The sensor is located in a load path between an occupant's seat and the vehicle floor. While the occupant is seated his weight causes a load beam within the cell to deflect. A sense element is mounted to the load beam and is deflected therewith. The sense element converts this deflection into an electrical property indicative of the occupant's weight. If the load beam is subjected to a large enough force, however, it may be deflected beyond its range of elasticity and assume a permanent deflection or "offset". This offset is undesirable and, depending on the magnitude of offset and the ability of other electronics in the occupant classification system to compensate for it, may result in a need to replace the sensor.

It is therefore desirable to provide a method for mounting an occupant classification sensor which prevents over-deflection of the sensor's load beam or similar deflecting member.

SUMMARY OF THE INVENTION

Accordingly, an aspect of the present invention is to provide a method for mounting an occupant classification sensor which limits movement of the sensor's load beam or other deflecting member.

In accordance with these aspects, an over-travel protection device for placing in a load path between a load cell and an object being weighed is presented. The device has a first member adapted for placing in the load path and a second member also adapted for placing in the load path. An elastic member is disposed between the first member and the second member, and a retaining member is adapted to limit separation displacement between the first and second members.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

FIG. 1 shows a perspective view of an over-travel protection device connected to an occupant classification sensor, and FIG. 2 shows a partial cross-section view of FIG. 1.

DETAILED DESCRIPTION OF THE PREFERRED EMBODIMENT

Turning to FIG. 1, an over-travel protection device (OTP) 1 is shown attached to an occupant classification sensor 3. A pair of bolts 6 secure OTP 1 to a load beam 8 of sensor 3 and a seat base 10. Seat base 10 and a seat rail 18 are omitted from FIG. 1 to provide an unobstructed view of OTP 1. A bushing 12 and washer 14 are provided at each bolt 6 location to evenly distribute the bolt's clamping load through beam 8. A bolt 16 is provided for attaching OTP 1 to a seat rail 18. The OTP 1 has a shunt body 20 with a pair of threaded openings 22 for receiving bolts 6 and a third opening 24 for receiving top member 25. A lateral clearance 28 is defined by top member 25 and the perimeter of third opening 24.

Turning to FIG. 2, a cross section diagram of an OTP 1 is shown arranged in a load path between a seat rail 18 and a seat base 10. Occupant classification sensor 3 is also arranged in the load path between the OTP 1 and the seat base 10.

In pertinent part, load beam 8 of the occupant classification sensor (OCS) 3 is secured to the seat base 10 at each end by bolts 6. Each bolt 6 is coaxially aligned with a washer 14 and a bushing 12, and is threadably secured to shunt body 20. Seat base 10 is clamped between the shunt body 20 and the bushings 12, thereby securing the OTP 1 and OCS 3 to seat base 10. The bushings 12 and washers 14 further operate to minimize residual forces in beam 8 due to torque forces applied by bolts 6. An orifice is provided at the center of beam 8 for receiving bushing 12, which is coaxially aligned with a washer 14.

OTP 1 has a stud 30 with an integral bolt 32, which provides an attachment point for the load beam 8. Integral bolt 32 protrudes through a bushing 12 and a washer 14. Nut 34 is threaded to the integral bolt 32 and compresses the assembly of beam 8, bushing 12 and washer 14, against a shoulder 36 of stud 30. A retaining lip 38 extends radially to the outer periphery of stud 30.

The OTP 1 also has a top member 25 with a threaded opening 23 disposed therein, which provides an attachment point for the seat rail 18. Bolt 16 secures seat rail 18 to the top member 25. Bolt 16 may also secure a seat motion component 42, such as a movement member for power seats. In one aspect of the invention the threaded opening 23 is coaxial with integral bolt 32 of the stud 30.

Looking briefly to within dashed oval A, a portion of the top member 25 is shown prior to a crimping operation. A crimp flange 44 is provided at the outer periphery of top member 25. A compressible element 46, such as made from a rubber material, is disposed within a cavity defined by the adjacent portions of top member 25, stud 30, and retaining lip 38. During manufacture of the OTP 1, crimp flange 44 is crimped radially inward to become retaining ledge 44' as shown in dashed circle B. The retaining ledge 44' is dimensioned to capture retaining lip 38 within the radially outer portion of top member 25, thereby limiting separation displacement between top member 25 and stud 30.

An shunt body 20 has a cavity for receiving top member 25, which protrudes from opening 24. A shunt ledge 54 extends over a shoulder formed in top member 25. An upper vertical clearance 50 is provided between the shunt ledge 54 and seat rail 18, and a lower vertical clearance 52 is provided between the shunt ledge 54 and the shoulder of top member 25.

In operation, an OTP 1 is placed at a mounting point for a vehicle seat. At the mounting point, the vehicle seat (not shown) is engaged with seat rail 18, and seat base 10 is made fast to the vehicle floor. The OTP 1 and OCS 3 are secured between the seat rail 18 and seat base 10. When an occupant is seated, the occupant's weight is distributed among several, usually four, vehicle seat mounting points. A portion of the occupant's weight is shown as force F, which is approximately equally distributed through the load path to seat base 10 via bolts 6.

For levels of force F which are within the predetermined operating range of OCS 3, the force is applied to the load beam 8 via a path through the top member 25, compressible element 46, and stud 30. As force F is applied, the seat rail 18 deflects vertically by an amount Δx together with the columnar assembly of the top member 25, compressible element 46, and stud 30. As the columnar assembly deflects vertically, one of the upper or lower vertical clearances 50, 52 gradually closes depending on whether F is positive (downward) or negative (upward) respectively. The load beam 8, which is connected to stud 30, also deflects vertically by Δx.

In accordance with the present invention, the unloaded height of upper and lower vertical clearances 50, 52 is determined by the maximum allowable positive and negative deflections of load beam 8, respectively. When a force F is applied that would otherwise deflect the load beam 8 beyond its maximum allowable deflection, one of the clearances 50, 52 closes against shunt ledge 54 and prevents over-deflection of the load beam. For example, when an excessive positive, or downward, force F is applied to the seat rail 18, the seat rail deflects downward and lands against shunt ledge 54, thereby closing upper vertical clearance 50 and limiting deflection of the load beam 8. The portion of force F which would otherwise over-deflect load beam 8 is thereby shunted through shunt body 20 to the seat base 10, protecting the load beam 8 from over-deflection in the positive direction. Similarly, when an excessive negative, or upward, force F is applied to the seat rail 18, the seat rail deflects upward and lands the shoulder of top member 25 against shunt ledge 54, thereby closing lower vertical clearance 52 and limiting deflection of the load beam 8. The portion of force F which would otherwise over-deflect load beam 8 is shunted through shunt body 20 to the seat base 10, protecting the load beam 8 from over-deflection in a negative direction.

If an offset load component, such as a force perpendicular to force F, is applied to the seat rail, load beam 8 experiences a bending moment as indicated by moment arrows M. In this situation, deflection of load beam 8 is also limited. As the offset force increases, top member 25 moves laterally until lateral clearance 28 closes when top member 25 comes to rest against shunt body 20. A small portion of the lateral force acts upon load beam 8 through top member 25, compressible member 46, and stud 30. The more significant remainder of the lateral force is shunted to seat base 10 via shunt body 20, thereby protecting load beam 8 from an excessive bending moment. Compressible element 46 may also be used to absorb all or some of lateral displacement of top member 25, thereby limiting lateral displacement of stud 30. Compressible element 46 also effectively prevents load beam 8 from being influenced by forces other than F.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An over-travel protection device for placing in a load path between a load cell and an object being weighed, the device comprising:
   a first member positioned to be in the load path, said first member including a circular top member with a radially inwardly crimped periphery;
   a second member positioned to be in the load path and arranged to cooperate with the first member to transfer load force from the object to the load cell, the first and second members defining a space between one another and said second member including a retaining lip;
   a compressible member disposed in said space between said first member and said second member; and
   a retaining member adapted to limit separation displacement between said first and second members, said retaining member includes said retaining lip being captured by said inwardly crimped periphery.

2. The device of claim 1 wherein said compressible member is made of rubber.

3. A seat assembly for a vehicle, the assembly comprising:
   a seat rail;
   a seat base;
   a load cell positioned in a load path between said seat rail and said seat base; and
   an over-travel protection device connected to said load cell and positioned in said load path and arranged to limit the displacement of said load cell to a predetermined amount, said over-travel protection device comprising:
     a first member adapted for placing in the load path, said first member including a circular top member with a radially inwardly crimped periphery;
     a second member adapted for placing in the load path, said second member including a retaining lip;
     an elastic member disposed in a cavity defined between said first member and said second member; and
     a retaining member adapted to limit separation displacement of said first and second members, said retaining member includes said retaining lip being captured by said inwardly crimped periphery.

4. The assembly of claim 3 wherein said elastic member is made from a rubber material.

5. A seat assembly for a vehicle, the assembly comprising:
   a seat rail;
   a seat base;
   a load cell having a predetermined range of displacement and positioned in a load path between said seat rail and said seat base; and
   an over-travel protection device connected to said load cell and positioned in said load path, said over-travel protection device comprising:
     a first member adapted for securing in the load path, said first member including a circular top member having a radially extending shoulder portion;
     a second member connected to said first member and adapted for securing in the load path;
     a retaining member for limiting separation displacement between said first and second members; and
     a shunt body, said shunt body having an opening disposed therein for containing said circular top member and comprising a shunt ledge extending radially inwardly over said radially extending shoulder portion, wherein motion of said first member due to a load applied across the load path is limited by mechanically contacting said shunt body and said motion is limited to a distance less than or equal to said predetermined range of displacement, and wherein said first portion mechanically contacting said shunt body occurs between said radially extending shoulder portion and said shunt ledge.

6. The assembly of claim 5 further comprising a compressible member disposed between said first and second members.

7. The device of claim 6 wherein said compressible member is made of a rubber material.

* * * * *